Jan. 3, 1956  G. SLAYTER  2,729,030
METHOD OF AND APPARATUS FOR LINEARLY FEEDING
AND UNTWISTED, MULTIFILAMENT STRAND
Filed July 2, 1954  4 Sheets-Sheet 1
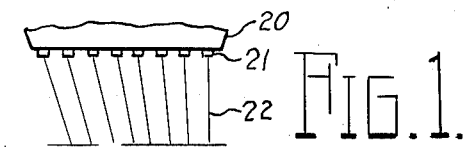
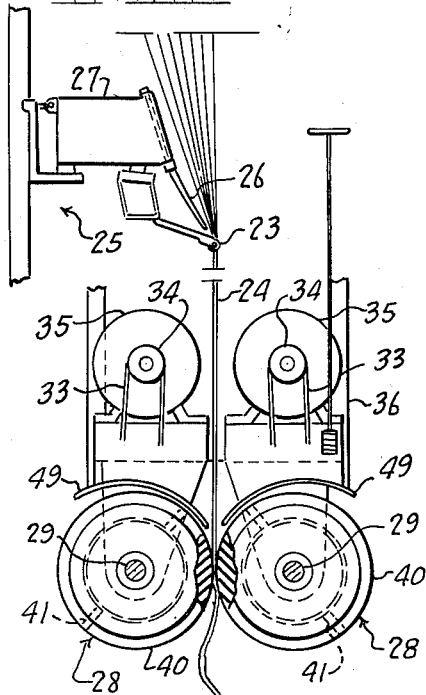
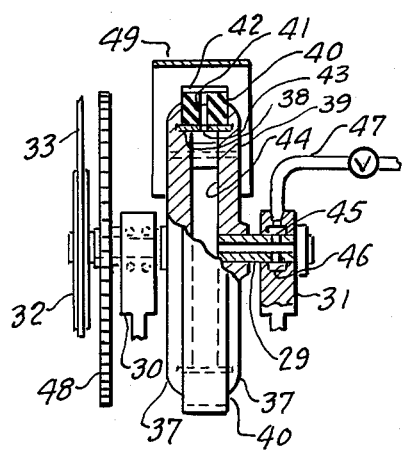
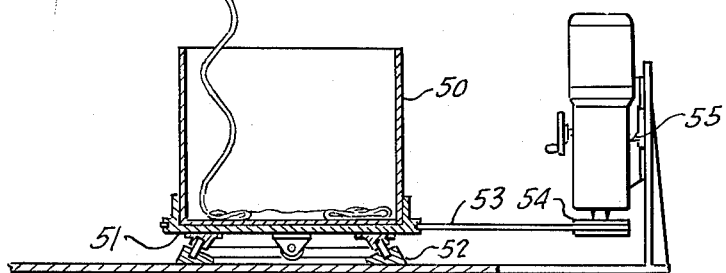
INVENTOR.
*Games Slayter*
BY
ATTORNEYS Jan. 3, 1956  G. SLAYTER  2,729,030
METHOD OF AND APPARATUS FOR LINEARLY FEEDING
AND UNTWISTED, MULTIFILAMENT STRAND
Filed July 2, 1954  4 Sheets-Sheet 2
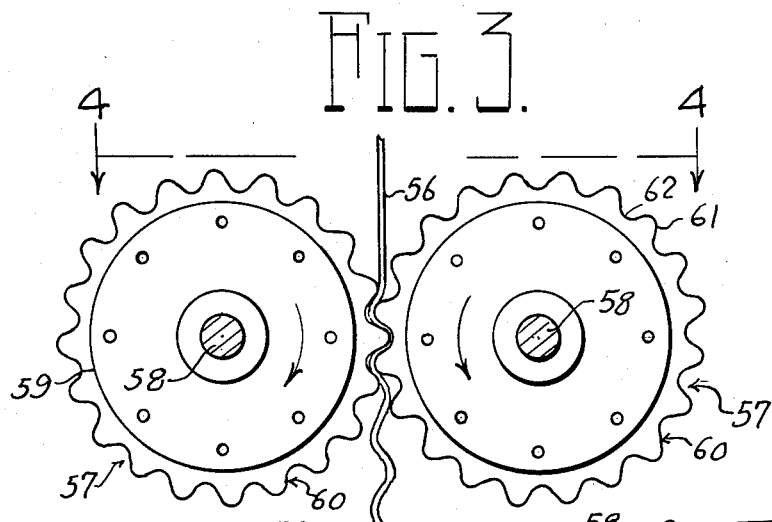
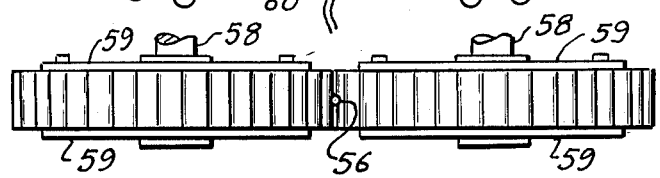
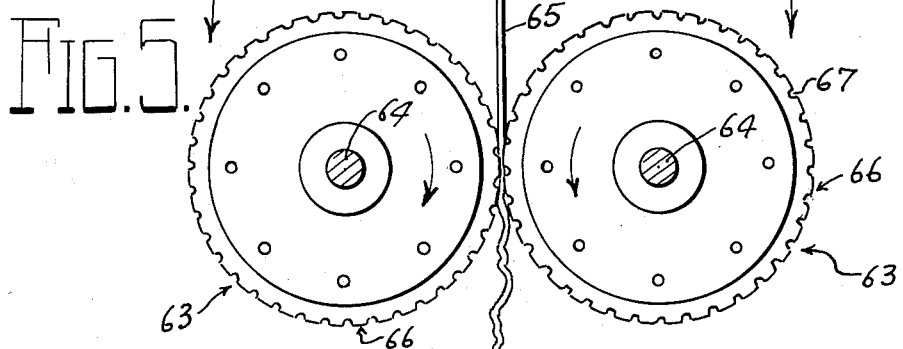
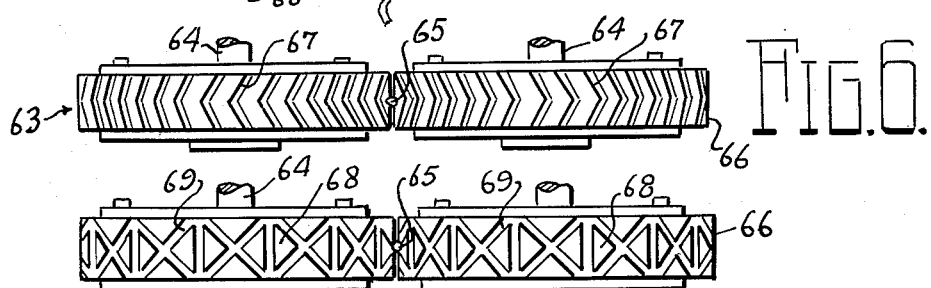
INVENTOR.
Games Slayter
BY
ATTORNEYS

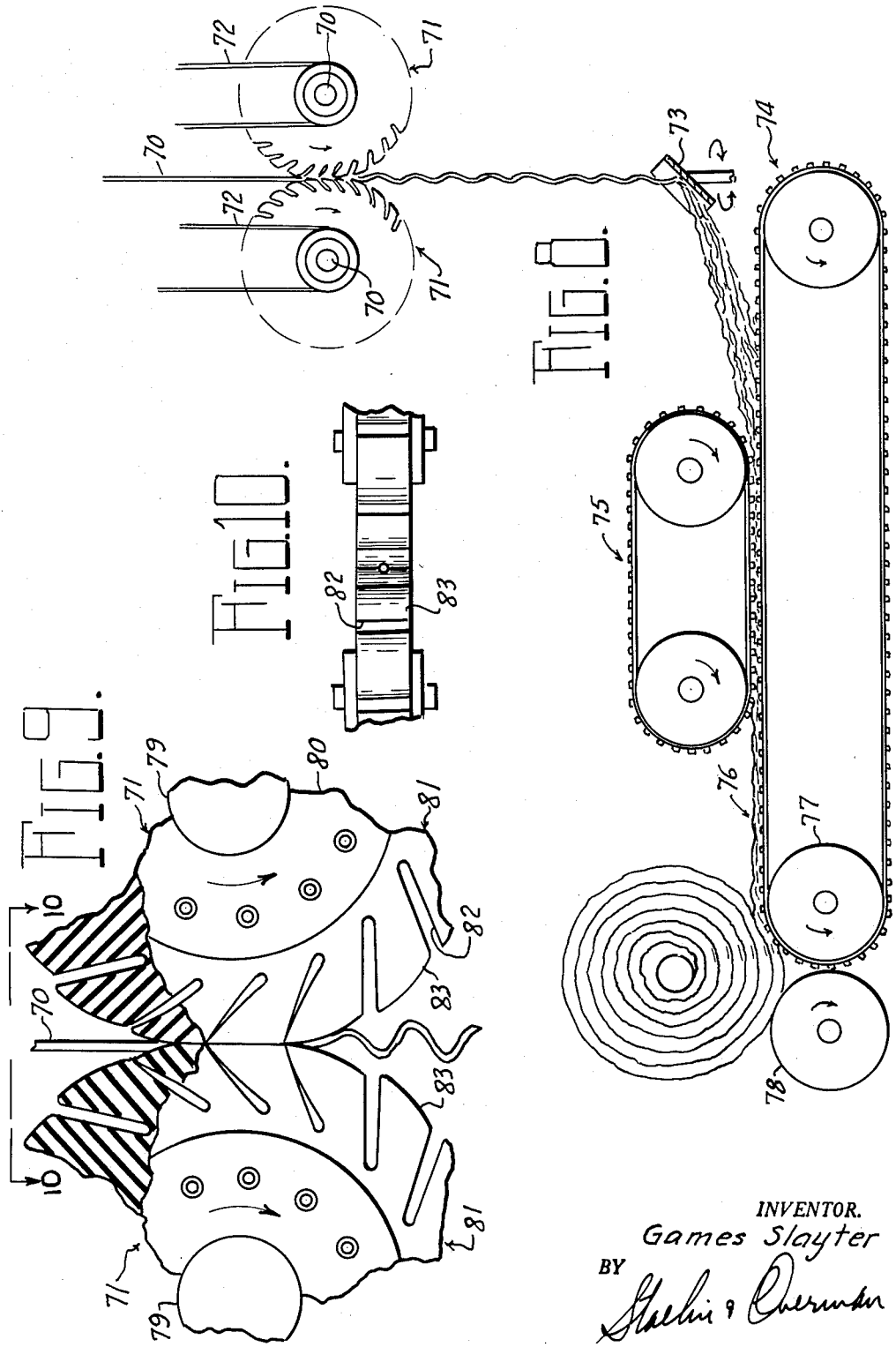

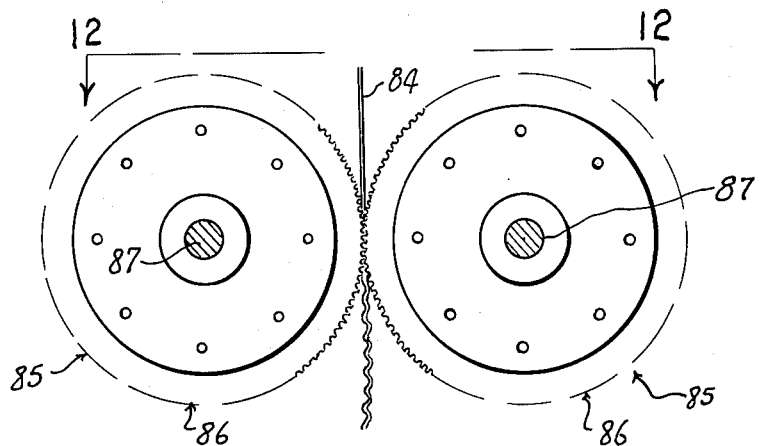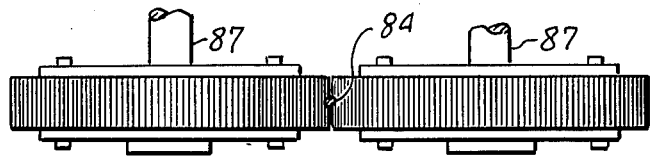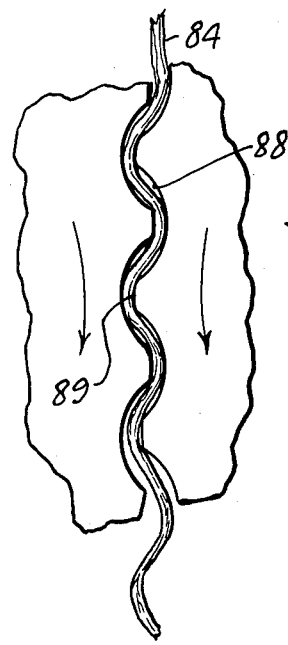

United States Patent Office 2,729,030
Patented Jan. 3, 1956

2,729,030

METHOD OF AND APPARATUS FOR LINEARLY FEEDING AN UNTWISTED, MULTIFILAMENT STRAND

Games Slayter, Newark, Ohio, assignor to Owens-Corning Fiberglas Corporation, a corporation of Delaware Application July 2, 1954, Serial No. 440,908

15 Claims. (Cl. 49—17)

This invention relates to a method of and an apparatus for feeding an untwisted, multifilament strand and constitutes a continuation-in-part of my co-pending application Serial No. 195,062 which was filed November 10, 1950, and which was entitled "Method and Apparatus for Forming and Collecting Fibers."

The method and apparatus of the present application are especially suitable for the continuous attenuation of glass fibers from minute streams of molten glass by associating the fibers into a generally parallel group and applying tractive force thereto to attenuate the streams and to feed the group of continuous filaments in an untwisted, multifilament strand. Conventional practice in this art for the formation of continuous filaments of mineral materials such as glass, has embodied the flowing of minute streams of molten material and the attenuation of these streams into continuous filaments by the engagement of the filaments with the exterior of a rotary sleeve or drum that serves as a package on which the strand is wound.

The principal problems inherent in such methods ensue from the increasing build up of tension on the mass of accumulating filaments as they are wound upon the constantly increasing exterior of the spool or drum and from the necessity for subsequently unwinding the untwisted, multifilament strand from the package in order to further process the strand.

It has been suggested that the problems of tension and unwinding could be avoided by pulling or feeding the untwisted, multifilament strand between the peripheries of rotary pulling wheels. Such attempts in the past have failed due to the fact that the group of fibers, frequently in the order of 200 to 400 in number, are not twisted together but merely grouped and, therefore, they are easily separated one from the other to wrap around the rotary pulling wheels, "licking" the peripheries of the wheels. This problem occurs where the linear speed of feeding of the strand reaches a figure such that economical commercial operation is possible. There is relatively little difficulty in feeding a multifilament strand at slow speeds in the order of a few hundred or perhaps a thousand feet per minute, but speeds in this range are too slow to successfully attenuate glass filaments of fine diameter with control of their characteristics and, consequently, in order to operate effectively the attenuation speeds have risen to the order of 10,000 feet per minute which inevitably results in the filaments or the complete strand itself licking one or both of the rotating pulling wheels with which attenuation is attempted.

The objective in trying to attenuate by means of rotary pulling wheels or some similar mechanism or method is to provide what might be termed a "free-handed" strand. Such a strand is one in which there was no tension applied to the end of the strand after it had passed through the atenuating mechanism. This contrasts with the conventional method for attenuating such multifilament strands wherein the end of the strand is wrapped around the spool or drum as mentioned above.

The principal object of this invention is to provide a method and apparatus for the feeding of an untwisted, multifilament strand at a high lineal speed with sufficient tractive force so that the strand can be attenuated simultaneously and without requiring that the end of the strand be fastened to a tension applying means.

Another object of the present invention is to provide a method and apparatus for continuously attenuating a group of continuous filaments as an untwisted strand and delivering the untwisted strand along a predetermined, controlled pathway so that the strand is deposited at, or delivered to, a precise point at which it either can be gathered or given subsequent treatment for the fabrication of finished products.

A still further object of the present invention is to provide a method and apparatus for the high speed attenuation of a large number of fine, continuous filaments of glass in the form of an untwisted strand wherein the strand is delivered from the attenuating mechanism according to the method along a substantially linear pathway with a high impetus such that it arrives at a precisely located collecting or handling station with an impetus much greater than that achieved under the free fall of gravity and with sufficient kinetic energy so that it can be directed through subsequent operations or steps.

These objectives are accomplished according to the instant invention by the combination of several factors. The method of the invention includes the positive grasping of the untwisted strand of continuous filaments with sufficient force so that the filaments can be continuously and uniformly attenuated. It includes the step of laterally deforming the strand upon opposite sides of the general linear path of movement of the strand so that mechanical force can be applied not only to the exterior ones of the group of filaments of which the strand is composed but also through a "snubbing" action to the interior ones of the individual filaments. This phase of the method of the instant invention appears to overcome the tendency of the filaments to separate one from the other as, for example, in the use of conventional circular periphery pulling wheels where the outer filaments might lick on the wheels and be separated away from the internal filaments. The method of the invention further contemplates the maintenance of the lateral deformations in the strand during the time of projection or delivery of the strand along the lineal pathway leading to the subsequent collecting or handling station. The deformations referred to are not permanent, i. e., the strand is not "crimped" but no section of the strand is believed to travel along a wavy or sinusoidal pathway. Each section of the strand travels along a straight path but the strand as a whole presents a general sinusoidal appearance.

The apparatus embodying the invention is illustrated herein in several modifications, each of which is believed to perform according to the method of the invention and each of which is successful in attenuating and feeding an untwisted multifilament strand at high speeds.

The operation of the method and of the apparatus will be better understood from the specification and from the drawings in which:

Fig. 1 is a simplified view in elevation of apparatus embodying the invention and operating according to the method of the invention for the attenuation and feeding of a multifilament, untwisted strand of glass fibers and includes a simplified showing of apparatus for accumulating a mass of the filaments attenuated and fed according to the invention.

Fig. 2 is a fragmentary view in side elevation and on an enlarged scale of one form of pulling wheel embodying the invention.

Fig. 3 is a view in elevation of a pair of coacting pulling wheels embodying a modification of the invention.

Fig. 4 is a plan view of wheels shown in Fig. 3 taken substantially from the position indicated by the line 4—4 of Fig. 3.

Fig. 5 is a view similar to Fig. 3 but of yet another modification of the invention.

Fig. 6 is a view taken from the position indicated by the line 6—6 of Fig. 5.

Fig. 7 is a view similar to Fig. 6 but showing still another modification of the invention.

Fig. 8 is a simplified view in elevation of another form of pulling wheel embodying the invention as employed with auxiliary equipment for the direct fabrication of a finished product from the multifilament, untwisted strand which is projected along a lineal path to a precise location according to the invention.

Fig. 9 is a fragmentary view on an enlarged scale of the pulling wheels illustrated in Fig. 8 and showing details of their construction.

Fig. 10 is a fragmentary plan view taken substantially from the position indicated by the line 10—10 of Fig. 9.

Fig. 11 is a view similar to Figs. 3 and 5 but of yet another embodiment of the invention.

Fig. 12 is a plan view taken substantially on the line 12—12 of Fig. 11.

Fig. 13 is a greatly enlarged fragmentary view in elevation of the cooperating portions of pulling wheels embodying the invention in the modification illustrated in Fig. 11.

In Fig. 1 of the drawings apparatus embodying the invention and operating according to the invention is illustrated in connection with the continuous attenuation and feeding of a multifilament, glass fiber strand and the projection of that strand into a receptacle for its accumulation. In Fig. 1 a glass melting tank or bushing 20 is illustrated as having a plurality of stream forming orifices 21 through each of which a fine stream of molten glass flows. The individual streams of glass are pulled downwardly and, as they cool, attenuated into fine continuous filaments 22 which are grouped together over a guide 23 into an untwisted, multifilament strand 24. The guide 23 is mounted by a bracket generally indicated at 25 and a suitable lubricant or other coating material, for example, simply water, may be dripped onto the guide 23 by a nozzle 26 from a supply tank 27.

The untwisted strand 24 is led downwardly and between the co-acting peripheries of a pair of high speed rotary pulling wheels 28. Each of the pulling wheels 28 is mounted on a hollow rotating shaft 29 (see also Fig. 2) which is journalled in bearings 30 and 31. Each of the pulling wheels 28 is driven through the medium of a pulley 32 in which a belt 33 is engaged, each of the belts 33 also being engaged in a motor pulley 34 on one of a pair of driving motors 35 that are mounted upon a framework 36.

Each of the pulling wheels 28 (see particularly Fig. 2) consists of a pair of radially extending wheel disks 37 assembled on opposite sides of a spacing ring 38 and held together by axially extending, peripherally spaced bolts 39. A rim 40 illustrated in Fig. 2 as consisting of an annular shaped piece of resilient material is clamped between the edges of the disks 37 and has a generally circular periphery.

In this embodiment of the invention the annular rim 40 of each of the wheels 28 has two or more radially extending passageways 41 placing the space between the disk 37 in communication with the peripheries of the wheels 28 and each of the passageways 41 may intersect an axially extending slot 42 in the periphery of the rim 40. Passageways 41 align with corresponding holes 43 through the ring 38. The two disks 37 being spaced from each other, there is left a thin enclosed area 44 which is in communication through the hollow shaft 29 and radial passageways 45 with an annular chamber 46 in the bearing 31 and the chamber 46 has connected thereto an air pressure line 47.

If desired, each of the pulling wheels 28 may be driven by the separate belts 33 from synchronous motors 35 or, see particularly Fig. 2, each of the shafts 29 may also mount a gear 48 with the two gears being meshed so that the wheels are driven in synchronism by the intermeshed gears 48. The shafts 29 serve as axes for the wheels 28 and are parallel with each other and so spaced that the peripheries of the rims 40 are squeezed against and around the strand 24 where it passes through the nip between the wheels 28. The precise spacing of the axles 29, while important, is not critical to the extent of a few thousandths of an inch but the two peripheries of the rim 40 when rotating at high speed must be squeezed tightly enough against and around the strand 24 to apply tractive force to the strand 24 to attenuate all of the fibers 22 which are associated to form the strand 24. Where, in most commercial installations, from 200 to 400 individual filaments 22 are associated to form each of the strands 24, the resistance to linear movement to the strand 24 is considerable, it being the combination of force necessary to attenuate each of the streams and to feed the filaments over the associating guide 23. Because the filaments are not twisted or otherwise cohered, the pressure between the peripheries of the rims 40 must be sufficient to squeeze the filaments tightly together to obviate slippage between the filaments and, consequently, damage to the strand 24.

The embodiment of the invention illustrated in Figs. 1 and 2 is provided with means in the rims 40 whereby substantially alternate forces are applied to the strand 24 as it departs from the bite between the wheels 28 to laterally deform the strand 24 upon opposite sides of the generally linear path extending from the bite to the place of collection or subsequent handling of the strand 24. These means in the embodiment of Figs. 1 and 2 consist of the radially extending air passageways 41 and the means for supplying a quantity of air to the passageways 41. As the wheels 28 rotate, for example, at a linear speed in the order of 10,000 feet per minute, the passageways 41 are alternately brought around and into the bite between the wheels 28. The jets of air escaping from the passageways 41 are prevented from adversely affecting the feeding of the strand 24 before it enters the bite between the wheels 28 by a pair of arcuate guards 49 spaced above the wheels 28.

As the strand 24 departs from or, more correctly, is projected from, between the wheels 28, the jets of air escaping from the passageways 41 apply force to the strand 24 laterally deforming it away from that one of the wheels 28 in which the particular passageway 41 is located at that time just below the bite between the wheels 28. The deformation in the strand 24 produced by the alternately applied forces of the jets escaping from the passageways 41 is not a permanent deformation in the sense of a crimped or kinked strand but is a temporary deformation which effectively prevents the adherence of any of the individual filaments making up the strand 24 to the surface of either of the pulling wheels 28. Without the application of some force during the location of the strand 24 between the pulling wheels 28 or immediately upon its departure from the bite, it has been observed that the individual filaments of the strand 24 inevitably separte from each other and at least some of the filaments, and usually the entire strand 24, licks around one or both of the pulling wheels 28.

The deformations in the strand 24 produced by the alternately applied force cause the strand to be projected from between the pulling wheels 28 more or less in the wave form pattern illustrated in Fig. 1. It will be appreciated that the pattern shown in Fig. 1 is not accurate and is only illustrative of one type of pattern which is formed by pulling wheels embodying the invention as shown in Figs. 1 and 2 and by such wheels when equipped with two radially extending passageways 41 apiece. It will be appreciated that if more than two radially extending passageways 41 are present in the wheels 28, the wave length of the deformations in the strand 24 which they create will be correspondingly shorter and similarly the amplitude of the wave will be less.

By reason of the strand 24 being thus deformed, it is projected under control to a substantial distance away from the pulling wheels 28 but since the size of the deformations in the strand 24 is under careful control and since its direction of projection is constant, the exact position to which auxiliary equipment may be placed is known and the strand can be depended upon to arrive at exactly that position continuously.

In Fig. 1 there is shown a receptacle 50 mounted upon a rotary table 51 which turns on a circular track 52 and is driven by a belt 53 engaged with the periphery of the table 51. The belt 53 is driven by a power pulley 54 on a motor driven, speed control unit 55. By properly placing the receptacle 50 and the track 52 the strand can be laid down in accumulating helical layers of generally sinusoidal pattern without any entanglements or snarls and the container 50 can be gradually completely filled with a compacted, dense mass of continuous strand. It is to be understood that the mechanism consisting of the receptacle 50 and means for mounting and driving it, does not constitute a part of the instant invention either from a method or apparatus standpoint but it is shown in Fig. 1 as illustrative of strand handling means which may be emplaced in position so that a strand attenuated and fed according to the instant invention is made available constantly for subsequent utilization.

Fig. 3 illustrates another modification of apparatus embodying the invention and is confined to a showing of high speed rotary pulling wheels constructed according to the invention without the equipment for driving and mounting them, for providing the streams which are attenuated to form a strand 56, or any auxiliary equipment for subsequent handling of the strand 56. In Fig. 3 and in all subsequent figures it is to be understood that the strand illustrated therein, like the strand 24 of Fig. 1, comprises a considerable number of continuous filaments which are associated together in general parallelism in untwisted form exactly as they are attenuated and gathered as shown in Fig. 1.

The pulling wheels 57 as shown in Fig. 3 are mounted according to the invention on a parallel spaced axes 58 and each of the pulling wheels 57 consists of a pair of disks 59 between the edges of which there is mounted a rim 60. In this embodiment of the invention each of the rims 60 is formed with a plurality of uniform scallops made up of hills 61 and valleys 62. The precise configuration of the hills 61 and valleys 62 is not critical to the invention. The form illustrated in Fig. 3 has a relatively small number of relatively large hills and valleys in each of the rims 60. It is important, however, that the pulling wheels 57 shall be of such size and that the parallel axes 58 upon which they are mounted shall be so spaced that the peripheries of the rims 60 engage each other tightly against opposite sides of and around the strand 56 where it passes therebetween. In other words, in the bite between the pulling wheels 57 the tops of the hills 61 are tightly squeezed against the bottoms of the valleys 62 and the strand 56 is tightly grasped between the engaged peripheral surfaces of the rims 60. In order to thus tightly grasp the strand 56 at least one of the rims 60 is fabricated from a resilient material such as natural or synthetic rubber acting against a hard rim or, in other cases, both of the rims are resilient.

In the embodiment of Figs. 3 and 4 means in the rims 60, in this instance consisting of the hills and valleys 61 and 62, laterally deform the strand 56 upon opposite sides of its generally linear path of movement as the strand 56 enters and while it is located between the pulling wheels 57 in the bite. Again, the tight pressure between the peripheries of the rims 60 in the bite applies the tractive force necessary to attenuate the strand 56 and the means in the rim 60 laterally deform the strand so that it departs from between the wheels in a generally wave form pattern. The wave form pattern in this case is more nearly accurately shown because it is determined by the particular pattern of the hills and valleys 61 and 62 in the rims 60. However, like the wave form pattern created in the strand 24 by the pulling wheels 28 of Fig. 1, the pattern created in the strand 56 in Fig. 3 is a temporary pattern which continues with the strand as it moves along its line of projection from between the wheels 57 to a subsequent strand handling or accumulating station.

In Figs. 5 and 6 a pair of pulling wheels 63 is shown as mounted upon parallel spaced shafts 64 for the feeding of a strand 65. In this embodiment the pulling wheels 63 are substantially identical with those of the earlier embodiments except for the surface configuration of their rims 66. In the embodiment of Figs. 5 and 6 each of the rims 66 has a plurality of generally, transversely extending grooves 67 which may extend axially across the rims 66 or, as shown in Fig. 6, they may be "chevron" shaped. The rims 66 may have a regular pattern consisting only of grooves 67 which extend to the edges of the rims 66 or, as shown in Fig. 7, they may have a series of related grooves leaving projecting triangular portions 68 around the centers of the rims 66 and similar projections 69 along their edges.

As in the earlier described embodiments of the invention, each of the rims 66 is provided with means which act while the strand 65 is in the bite between the pulling wheels 63 or at the instance of its departure from the wheels 63 to create lateral deformations in the strand. In the embodiments of Figs. 5, 6 and 7 it is believed that the tight pressure between the peripheries of the rims 66 may slightly squeeze the strand 65 into the grooves 67 or the grooves between the projections 68 and 69. While these grooves 67 and spaces are narrow to the human eye and relatively small with respect to the size of the pulling wheels 63 themselves, they are large when compared to the diameter of the strand 65 being fed therebetween. It has been suggested that the squeezing of the strand 65 slightly into each of these grooves or spaces in the peripheries of the rims 66 creates a series of small lateral deformations in the strand 65 and that the trailing edges of the grooves 67 or spaces, i. e., the edges of the projections 68 for example, give each of the minute deformations of the strand 65 a flip or kick when it departs from the bite which exaggerates the deformations slightly, producing a strand pattern in the order of that generally indicated in Fig. 5 and involving considerable irregularity in the precise amplitudes and wave lengths of the pattern formed. It has also been suggested that the grooves 67 and projections 68 and 69 act to create small jets of air against the sides of the strand 65 as it departs from between the pulling wheels 63.

In any event, regardless of which explanation is, in fact, more nearly accurate, pulling wheels constructed according to Figs. 5, 6 and 7 operate to attenuate a multifilament, untwisted strand and to feed the strand, projecting it along a defined linear path which can terminate at a subsequent handling station with a definite pattern such that neither the strand nor its filaments tend to lick the exterior of the pulling wheels 63.

Figs. 8, 9 and 10 illustrate another embodiment of the invention as employed according to the invention for the attenuation and feeding of a multifilament, untwisted strand; in this instance, there also being shown subsequent handling equipment for the direct utilization of such a strand for the fabrication of a finished product.

In Fig. 8 a multifilament continuous and untwisted strand 70 is illustrated as being fed between the engaged peripheries of a pair of pulling wheels 71 embodying the invention. The pulling wheels 71 are rotated at a suitable peripheral speed, say in the order of 10,000 feet per minute, by driving belts 72 to project the strand 70 along a defined linear path leading to an oscillating inclined plate 73. Because of high linear speed of the strand 70 produced by the pulling wheels 71 according to the invention and because of the control of its form and its path of movement, the oscillating plate 73 can be fixedly mounted in position and will be constantly impinged upon by the driving strand 70. By inclining the plate 73 relative to the path of movement of the strand 70, the strand 70 can be deflected and by oscillating the plate 73 the strand 70 can be deflected back and forth. By selecting the proper inclination of the plate 73 with respect to the path of projection of the strand 70, the strand 70 can be opened up, i. e., its individual filaments separated one from the other to loosen the mass of filaments as is illustrated in Fig. 8 to a greater or lesser degree as desired. By oscillating the plate 73 a loose mass of filaments is "sprayed," as it were, off the plate 73 and onto the upper surface of a slat conveyor generally indicated at 74. By mounting a second similar conveyor 75 above the web of the conveyor 74 the mass of loosely opened filaments can be compressed to a desired extent to form a continuous mat indicated at 76 which is rolled up by means of a conveyor roller 77 and a second parallel roller 78.

The pulling wheels 71 illustrated in Figs. 8–10 are shown fragmentarily and on a substantially enlarged scale in Fig. 9. Each of the pulling wheels 71, like the pulling wheels of the earlier embodiments of the invention, is mounted upon one of a pair of spaced parallel shafts 79 which provides its axis. Each of the pulling wheels 71 consists of a pair of flanges 80 between the edges of which a rim 81 is rigidly mounted.

In this embodiment of the invention the rims 81 are cut to form a plurality of spaced, axially extending slots 82, each pair of which defines opposite sides of a "flipper" 83. In this embodiment of the invention the axes of the pulling wheels 71 are so spaced and the pulling wheels 71 of such size that when the wheels 71 are rotated at high speed the flippers 83 are squeezed tightly together in the bite between the pulling wheels 71 causing a generally rectilinear surface engagement between the rims 81 of the pulling wheels 71. As can be seen in Fig. 9 in the bite between the pulling wheels 71 the projections or flippers 83 are squeezed radially inwardly to a degree sufficient to substantially close the slots 82. The strand 70 is thus tightly grasped between the rims 81 by the compressed flippers 83.

While the flippers 83 in Fig. 9 are shown in phase this is merely illustrative of one condition under which they may be operated and they may also be operated in out-of-phase relationship.

Centrifugal force acting upon the flippers 83 when they are rotating to provide the high peripheral speed necessary causes each of them to be expanded radially as it departs from the bite between the pulling wheels 71. Each of the flippers 83 thus has an opportunity to apply a lateral force to the strand 70 to deform it laterally of its generally linear path of movement. Because the number of flippers around each of the wheels 71 is not critical and because it is not even essential that there be the same number of flippers 83 around each of the wheels 71, the strand pattern illustrated in Figs. 8 and 9 is merely illustrative. Regardless of the particular number of flippers 83 or of whether or not the same number exists on each of the wheels 71, attenuating and feeding pressure in abundance is maintained by centrifugal force acting upon the flippers 83. The flippers in this embodiment are the means in the rims 81 by which lateral deformations are created in the strand 70 so as to obviate the tendency of the strand to lick or adhere to the peripheral surfaces of the pulling wheels.

Figs. 11, 12 and 13 illustrate yet another embodiment of the invention which functions according to the invention to feed a multifilament, untwisted strand 85 at a high linear speed along a controlled pathway with an impetus sufficient so that the strand will arrive at a definite position for subsequent handling without fail.

In this embodiment of the invention a pair of pulling wheels 85 constructed in a manner similar to those of the earlier embodiments have rims 86 and are mounted upon parallel spaced shafts 87 so that the peripheries of the rims 86 are in tight contact in the bite between the wheels 85. As can best be seen in Fig. 13 the surface configuration of the rims 86 in this embodiment consists of alternate grooves 88 and axially extending ridges 89 which extend unbroken from side to side of the pulling wheels 85. The grooves 86 in the form of Fig. 13 are semicylindrical in shape and the tops of the projections 89 have curved surfaces which may be swung on the radius of the wheels 88 or they may be of shorter radius. The precise shapes of the grooves 88 and projections 89 are not critical and the form of Figs. 11–13, inclusive, is a modified form of the scalloped wheel of Fig. 3.

As in the earlier embodiments of the invention, the shafts 87 are so spaced and the pulling wheels 85 of such size that they are tightly squeezed together with the peripheries of the rims 86 engaged against and around the strand 84 being fed. As can best be realized by reference to Fig. 11, in this form of pulling wheel embodying the invention, the individual deformations consisting of a single groove 88 and projection 89 are very small when compared to those of the embodiment of Fig. 3 but, like the small grooves 67 of Fig. 5, they are very large when compared to the diameter of the strand 84 being fed. As is the case with several earlier embodiments of the invention, the strand 84 is laterally deformed while it is in the bite between the pulling wheels 85 and the lateral deformations are projected cleanly from between the pulling wheels 85.

When viewed at normal operating speed, say 10,000 feet per minute, the strand 84 as it leaves the pulling wheels 85 appears to be projected straight since the eye cannot detect the deformations shown in Figs. 11 and 13 in exaggerated form. Careful examination by high speed photography, however, reveals that, as in the other embodiments of the invention, a definite lateral displacement or deformation of the strand takes place. This lateral deformation prevents the licking or adherence of the strand or its filaments to the surfaces of the pulling wheels and it establishes a continuing, though temporary pattern in the strand, enabling the strand to be projected along a linear path with great impetus directly at or to a precisely located subsequent handling or treating station, where it arrives with an impetus much greater than under free fall so that its kinetic energy can be employed as illustrated, for example in Fig. 8, for the accomplishment of subsequent steps.

It is thus apparent that the precise configurations of the strand engaging surfaces of the rims are not fixed but that each rim according to the invention has means for producing the lateral deformations of the strand which enable attenuating to be accomplished, which prevent licking or adherence of the strand or its filaments to the rotary pulling wheels and which thus cause the projection or feeding of the strand along a linear path which can be precisely controlled with sufficient impetus or kinetic energy such that subsequent strand handling steps are made possible.

I claim:

1. A method of forming and attenuating fibers including the steps of providing streams of flowable material from a supply; of engaging a linear group of fibers formed from the streams of material with movable resilient surfaces interengaged in a manner whereby the surfaces establish substantial engagement with each other and with the linear group of fibers, of causing movement of the surfaces to continuously attenuate the streams of flowable material into fibers, of gathering the attenuated fibers into a continuous linear group prior to engagement of the resilient surfaces therewith, and of successively establishing differential zones of force adjacent the moving linear group of fibers to cause the latter to tranverse a nonrectilinear path away from the moving surfaces.

2. A method of forming and attenuating fibers including the steps of providing streams of flowable mineral material from a supply; of engaging the fibers formed from the streams between a pair of rotatable members having resilient surfaces interengaged in a manner whereby the surfaces are deformed to establish substantial area of contact with each other and with the fibers, of rotating the members to continuously attenuate the streams of flowable mineral material into fibers, and of intermittently establishing zones of differential force adjacent the moving fibers to cause the latter to traverse a nonrectilinear path.

3. A method of forming and attenuating a linear group of fibers including the steps of providing streams of flowable mineral material from a supply; of engaging a linear group of fibers formed from the streams with a pair of movable surfaces interengaged in a manner whereby the surfaces establish substantial engagement with each other and with the linear group of fibers, of causing movement of the surfaces to continuously attenuate the streams of flowable mineral material into fibers, of gathering the attenuated fibers into a continuous linear group prior to engagement of the surfaces therewith, and of successively applying differential forces across the linear group of fibers to cause the latter to traverse a nonrectilinear path away from the relatively movable surfaces.

4. A method of forming and collecting strands of fibers including flowing streams of molten fiber forming material from a supply; of engaging fibers formed from the streams with a fiber attenuating instrumentality to form the streams into comparatively fine fibers; of gathering the attenuated fibers into a linear group prior to engagement of the attenuating instrumentality therewith; of applying a coating to the fibers to maintain the same in linear group formation; of collecting the continuous linear group of fibers, and of directing fluid against the linear group of fibers causing the linear group of fibers to move in a nonrectilinear path from the attenuating instrumentality to the collecting zone.

5. Apparatus for forming a continuous, untwisted strand of fibers, in combination, means for supplying continuous streams of fiber forming material; means for attenuating the streams to fine fibers including a pair of pull rolls engageable with the fibers; means for rotating the rolls; means for gathering the fibers into a strand prior to their engagement with the rolls; and means associated with said pair of rolls directing forces against the strand of fibers for disassociating said strand of fibers away from the surfaces of said rolls.

6. Apparatus for forming and collecting a continuous strand of fibers, in combination, means for supplying continuous streams of fiber forming material; means for attenuating the streams to fine fibers including a pair of pull rolls engageable with the fibers; means for rotating the rolls; means for gathering the fibers into a strand prior to their engagement with the rolls; means associated with the pull rolls for causing nonrectilinear movement of the strand of fibers as it moves away from the rolls and collecting means for said strand spaced away from said rolls along a linear path therefrom.

7. A method of conveying and collecting a linear group of fibers including the steps of directing the linear group of fibers between relatively movable fiber-conveying surfaces; of establishing zones of differential fluid pressure for causing the fibers to move in an undulated path away from the fiber conveying surfaces, and of continuously collecting the fibers upon a relatively movable collecting surface.

8. A method of forming and collecting strands of fibers including flowing streams of molten fiber forming material from a supply; of engaging fibers formed from the streams with a fiber attenuating instrumentality to form the streams into comparatively fine fibers; of gathering the attenuated fibers into a linear untwisted strand prior to the engagement of the attenuating instrumentality therewith; of collecting said continuous strand of fibers and of applying force to said strand in addition to the attenuating forces applied by said attenuating instrumentality, transversely to the moving linear group of fibers, for causing the group of fibers to move in a nonrectilinear form along a generally linear path to a collecting zone.

9. Apparatus for attenuating and feeding a continuous, untwisted, linear group of filaments, in combination, a pair of juxtaposed interengaging members having deformable surface elements between which the linear material is directed; means for revolving the members to advance the linear material, and means in the surface elements of said members for applying transverse force to the linear material to cause undulatory movement thereof as the material moves away from the members.

10. Apparatus for forming and collecting a continuous strand of fibers, in combination, means for supplying continuous streams of fiber forming material; means for attenuating the streams to fine fibers including a pair of members having deformable interengaging peripheral rims engageable with the fibers; means for rotating the members; means for gathering the fibers into a strand prior to their engagement with the members; and means in said rims of said members for applying transverse forces to the strand for causing the strand to move in a nonrectilinear form and along a generally linear path to a collecting point.

11. A method for feeding a multifilament, untwisted strand that comprises a plurality of fine fibers oriented and laterally compacted into close parallel relationship, said method comprising engaging said strand between movable elements having resilient rims that are pressed together around and against opposite sides of said strand, moving said rims for feeding and projecting said strand along a generally linear pathway that is generally tangential to said elements at their place of contact with an impetus greatly in excess of that to be achieved by said strand under free fall, diverging the surfaces of said rims from each other and from such pathway, progressively displacing said strand laterally upon opposite sides of the center line of such pathway and projecting said strand along such pathway in such displaced form.

12. A method for feeding a multifilament, untwisted strand that comprises a plurality of fine fibers oriented and laterally compacted into close parallel relationship, said method comprising engaging said strand between movable elements, at least one of said elements having a resilient rim, the surfaces of said elements being pressed togther around and against opposite sides of said strand, moving said surfaces for feeding and projecting said strand along a generally linear pathway that is generally tangential to said elements at their place of contact with an impetus greatly in excess of that to be achieved by said strand under free fall, diverging said surfaces from each other and from such pathway, progressively displacing said strand laterally upon opposite sides of the center line of such pathway and projecting said strand along a generally linear pathway leading to a subsequent strand handling station.

13. Apparatus for linearly feeding an untwisted multifilament strand comprising a plurality of fine fibers oriented and laterally compacted into close parallel relationship, said apparatus comprising a pair of co-acting rotary pulling elements driven at a high peripheral speed, rim portions on said elements having resilient surfaces, said elements being mounted upon parallel axes so spaced that said surfaces are pressed together around and against opposite sides of said strand, means for guiding said strand between the engaged surfaces of said pulling elements, means for rotating said pulling elements at such high speed for drawing and projecting said strand along a generally linear pathway with an impetus greatly in excess of that to be achieved by said strand under free fall, and means in said rim portions of said pulling elements for imparting lateral forces to said strand from opposite sides of said strand upon departure of said strand from the bite between said pulling elements.

14. Apparatus for linearly feeding a multifilament, untwisted, strand comprising a plurality of fine fibers oriented and laterally compacted into close parallel relationship, said apparatus comprising a pair of rotary pulling wheels having resilient rims and being mounted upon parallel axes so spaced that the surfaces of said rims are pressed together around and against opposite sides of said strand, means for guiding said strand between the engaged surfaces of said pulling elements, means for rotating said pulling elements for drawing and projetcing said strand along a generally linear pathway with an impetus greatly in excess of that to be achieved by said strand under free fall, and means in the rims of said pulling elements for laterally displacing said strand upon opposite sides of the center line of such pathway upon departure of said strand from the bite between said pulling elements.

15. A method for forming and collecting strands of fibers, said method comprising flowing streams of molten fiber-forming material from a supply, engaging the fibers formed from the streams with a rotary fiber forming instrumentality to attenuate the streams ino comparatively fine fibers, gathering the attenuated fibers into a linear group prior to engagement thereof with said instrumentality, rotating said instrumentality at a high lineal speed, directing fluid against the linear group of fibers while in engagement with said instrumentality for causing said group of fibers to depart from the surface of said instrumentality and to move in non-linear form along a path to a collecting zone and collecting said fibers at said zone.

References Cited in the file of this patent

UNITED STATES PATENTS

| | | |
|---|---|---|
| 2,161,502 | Brown | June 6, 1939 |
| 2,323,918 | Kierman | July 13, 1943 |
| 2,447,131 | McDermott | Aug. 17, 1948 |